(12) United States Patent
Line et al.

(10) Patent No.: US 8,734,261 B1
(45) Date of Patent: May 27, 2014

(54) SLIP YOKE ASSEMBLY

(71) Applicant: Dana Automotive Systems Group, LLC, Maumee, OH (US)

(72) Inventors: Joshua D. Line, McComb, OH (US); DaWuan A. Smith, Sylvania, OH (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 0 days.

(21) Appl. No.: 13/790,845

(22) Filed: Mar. 8, 2013

(51) Int. Cl.
 *F16D 3/26* (2006.01)
(52) U.S. Cl.
 USPC .......................... 464/133; 138/89; 403/359.1
(58) Field of Classification Search
 USPC .......................... 464/131, 133, 134; 138/89; 403/359.1–359.6
 See application file for complete search history.

(56) References Cited

U.S. PATENT DOCUMENTS

| | | | |
|---|---|---|---|
| 1,058,210 A | 4/1913 | Welch | |
| 1,730,377 A | 10/1929 | Northrup | |
| 1,801,006 A | 4/1931 | Jacoby | |
| 2,078,212 A | 4/1937 | Leighton | |
| 2,665,818 A | 1/1954 | Borges et al. | |
| 2,687,228 A | 8/1954 | Knocke | |
| 3,400,558 A | 9/1968 | Haines | |
| 3,467,271 A | 9/1969 | Kaiser et al. | |
| 3,494,148 A * | 2/1970 | Young | |
| 3,497,906 A | 3/1970 | McFadden | |
| RE27,068 E | 2/1971 | Groves | |
| 3,881,324 A | 5/1975 | Girquis | |
| 3,958,411 A | 5/1976 | Bernt | |
| 4,049,151 A | 9/1977 | Schweiso | |
| 4,126,758 A | 11/1978 | Krumme | |
| 4,147,041 A | 4/1979 | Girguis | |
| 4,319,467 A * | 3/1982 | Hegler et al. | 464/133 X |
| 4,364,614 A | 12/1982 | Weis | |
| 4,379,707 A | 4/1983 | Fisher | |
| 4,475,737 A | 10/1984 | Cook | |
| 4,478,531 A | 10/1984 | Levinson et al. | |
| 5,309,875 A | 5/1994 | Gault | |
| 5,352,026 A | 10/1994 | Snook | |
| 5,425,585 A | 6/1995 | Hoffmann | |
| 5,562,546 A | 10/1996 | Koslowski et al. | |
| 5,579,661 A | 12/1996 | Yarnell | |
| 5,716,276 A | 2/1998 | Mangas | |
| 5,735,747 A | 4/1998 | Gehrke | |
| 5,836,823 A | 11/1998 | Shellaberger | |
| 6,125,541 A | 10/2000 | Parker | |
| 6,183,370 B1 | 2/2001 | Lim | |
| 6,202,280 B1 | 3/2001 | Parker | |
| 6,243,937 B1 | 6/2001 | Craig et al. | |

(Continued)

FOREIGN PATENT DOCUMENTS

FR 2660378 A1 10/1991

*Primary Examiner* — Gregory Binda
(74) *Attorney, Agent, or Firm* — Marshall & Melhorn, LLC

(57) ABSTRACT

A slip yoke assembly is provided. The slip yoke assembly includes a slip yoke having a long bore extending between a first end and a second end and a counterbore at the second end of the long bore. The counterbore has a first diameter and a second diameter. The first diameter is greater than a major diameter of the long bore and the second diameter is greater than the first diameter. The slip yoke assembly also includes a plug having an elastomeric member secured to a surface thereof. The elastomeric member is disposed within the first diameter and the plug is disposed within the second diameter. The plug is secured to the slip yoke by a lip formed over the plug.

20 Claims, 7 Drawing Sheets

(56) References Cited

U.S. PATENT DOCUMENTS

| | | |
|---|---|---|
| 6,247,702 B1 | 6/2001 | Long |
| 6,261,183 B1 | 7/2001 | Duggan |
| 6,348,002 B1 | 2/2002 | Breese |
| 6,368,242 B1 | 4/2002 | Irwin |
| 6,394,139 B1 | 5/2002 | Mitchell |
| 6,446,939 B1 | 9/2002 | Hoppe |
| 6,475,093 B1 | 11/2002 | Keyes |
| 6,585,235 B2 | 7/2003 | Pattullo |
| 6,619,873 B2 | 9/2003 | Parker |
| 6,840,865 B2 | 1/2005 | Lentini |
| 7,090,584 B2 | 8/2006 | Wang |
| 7,097,563 B2 | 8/2006 | Benson et al. |
| 7,115,037 B2 | 10/2006 | Schlegelmann et al. |
| 7,226,360 B2 | 6/2007 | Lyon et al. |
| 7,516,838 B2 | 4/2009 | Dutschke |
| 7,905,785 B2 * | 3/2011 | Madden et al. |
| 8,092,312 B2 | 1/2012 | Duncan |
| 2005/0054454 A1 | 3/2005 | Kurzeja |
| 2009/0114401 A1 | 5/2009 | Purkis |
| 2011/0005839 A1 | 1/2011 | Marchand |
| 2011/0215533 A1 | 9/2011 | Li |

\* cited by examiner

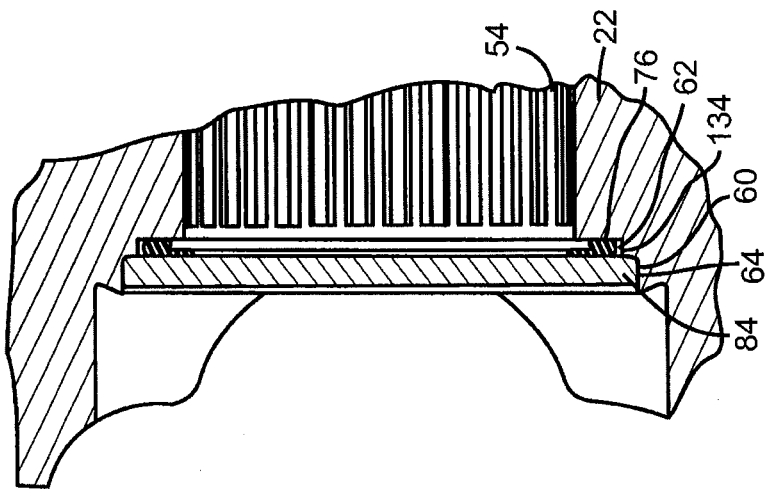
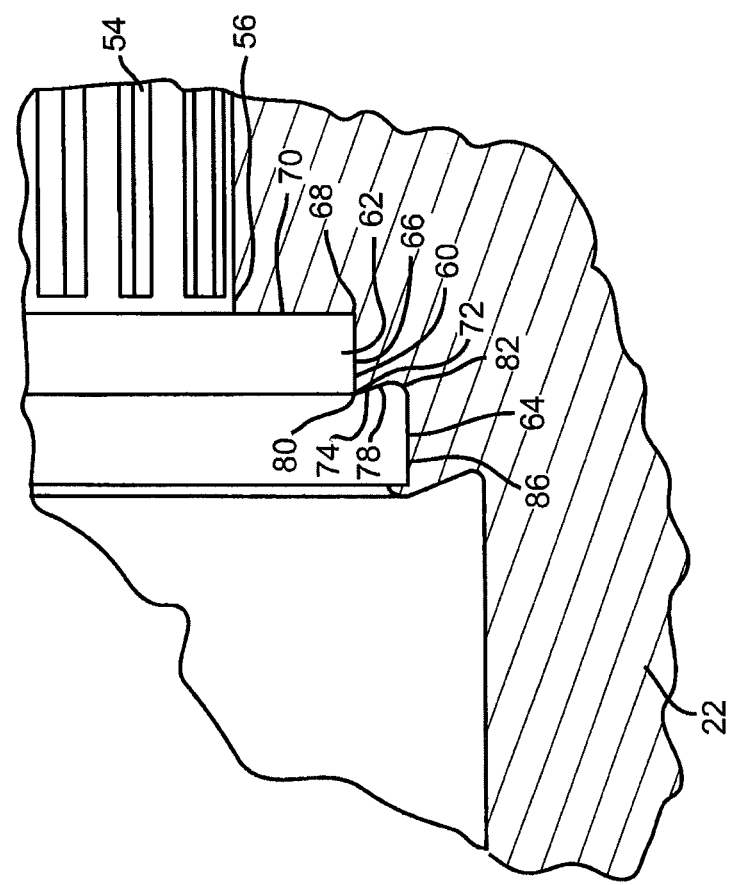

SLIP YOKE ASSEMBLY

BACKGROUND OF INVENTION

This invention relates in general to universal joints. In particular, this invention relates to a slip yoke assembly for use with a universal joint in a vehicle driveshaft assembly.

Slip yoke assemblies are used to transmit torque. Typical slip yoke assemblies include a slip yoke having internal splines which interconnect with splines on a transmission output shaft, transfer case output shaft or driveshaft. Lubricant such as grease, oil, transmission fluid or the like is used to tolerate axial translation between the shaft and the slip yoke when they are connected.

An end of the slip yoke is closed to retain or seal the lubricant and prevent dust and other contaminants from entering. Preferably, a fluid tight closure is provided. However, slip yoke assemblies are typically required to perform over an extended period of time, under heavy torque loads. Thus, lubricant leakage from or contaminants entering the end of the slip yoke assembly is common in the known assemblies. Both lubricant leakage and entering contaminants shorten the efficient life of the slip yoke assembly which is undesirable.

Therefore, it would be desirable to provide an improved slip yoke assembly which offers significant improvements in lubricant leakage from and preventing contaminants from entering an end of the assembly.

BRIEF SUMMARY OF THE INVENTION

In an embodiment, a slip yoke assembly is provided. The slip yoke assembly comprises a slip yoke having a long bore extending between a first end and a second end and a counterbore at the second end of the long bore. The counterbore has a first diameter and a second diameter. The first diameter is greater than a major diameter of the long bore and the second diameter is greater than the first diameter. The slip yoke assembly also comprises a plug having an elastomeric member secured to a surface thereof. The elastomeric member is disposed within the first diameter and the plug is disposed within the second diameter. The plug is secured to the slip yoke by a lip formed over the plug.

BRIEF DESCRIPTION OF THE SEVERAL VIEWS OF THE DRAWING

The above, as well as other advantages of the present invention will become readily apparent to those skilled in the art from the following detailed description when considered in the light of the accompanying drawings in which:

FIG. 4 is a partial cross-sectional view of a portion of a slip yoke suitable for use in the slip yoke assembly;

FIG. 4A is a cross-sectional view of portions of a slip yoke assembly in accordance with the invention taken prior to forming a lip of the slip yoke assembly;

DETAILED DESCRIPTION OF THE INVENTION

Figure 1:
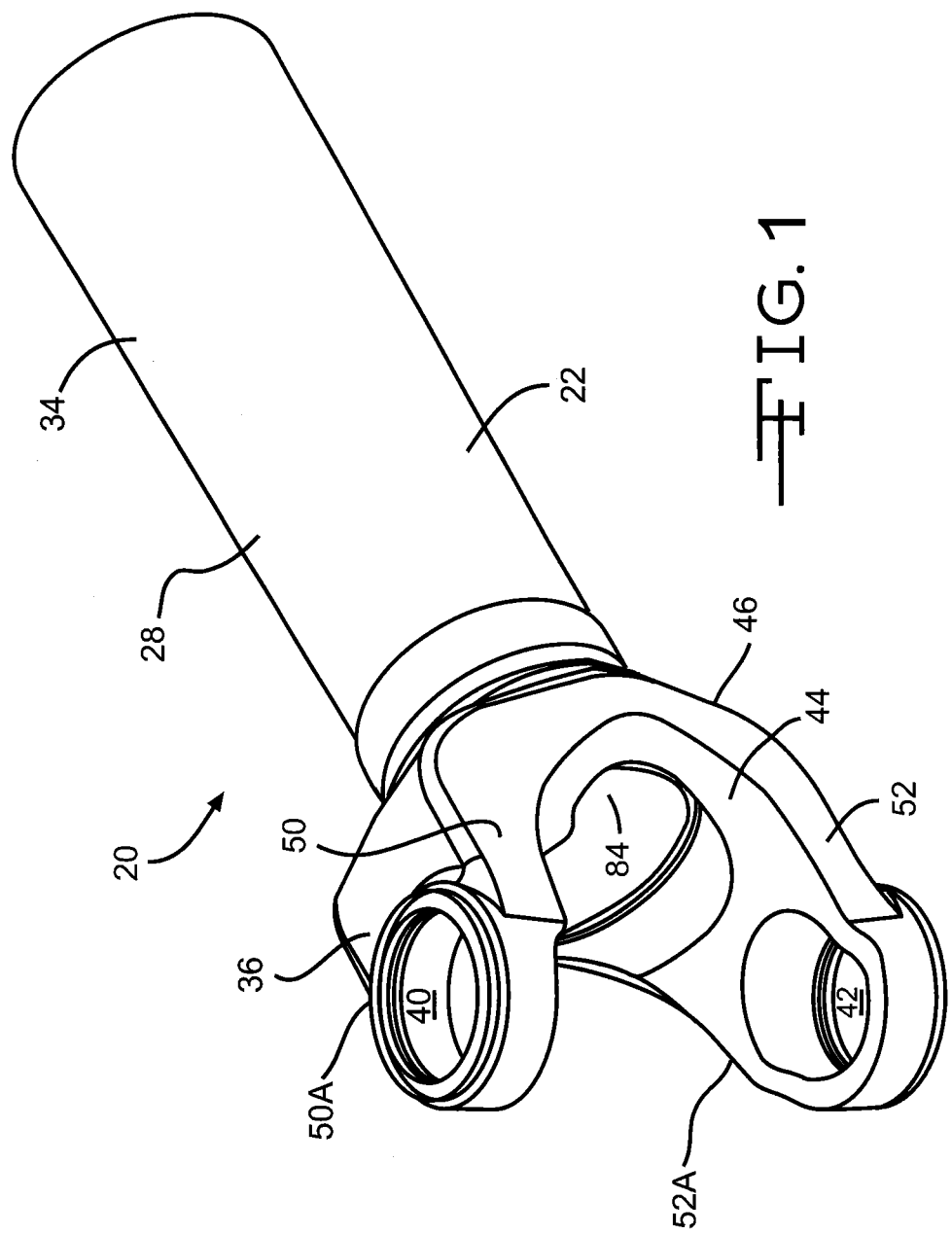
FIG. 1 is a perspective view showing a slip yoke assembly in accordance with the invention.

It is to be understood that the invention may assume various alternative orientations and step sequences, except where expressly specified to the contrary. It is also to be understood that the specific assemblies and features illustrated in the attached drawings, and described in the following specification are simply exemplary embodiments of the inventive concepts. Hence, specific dimensions, directions, or other physical characteristics relating to the embodiments disclosed are not to be considered as limiting, unless expressly stated otherwise. Also, although they may not be, like elements in various embodiments may be commonly referred to with like reference numerals within this section of the application.

A slip yoke assembly is provided. The slip yoke assembly will be described in connection with a universal joint for a vehicle. It would be understood by one of ordinary skill in the art that the various embodiments of the slip yoke assembly described herein may have applications to on-highway or off-highway vehicles. Furthermore, it would be understood by one of ordinary skill in the art that these embodiments could have industrial, locomotive, and aerospace applications.

Figure 2:
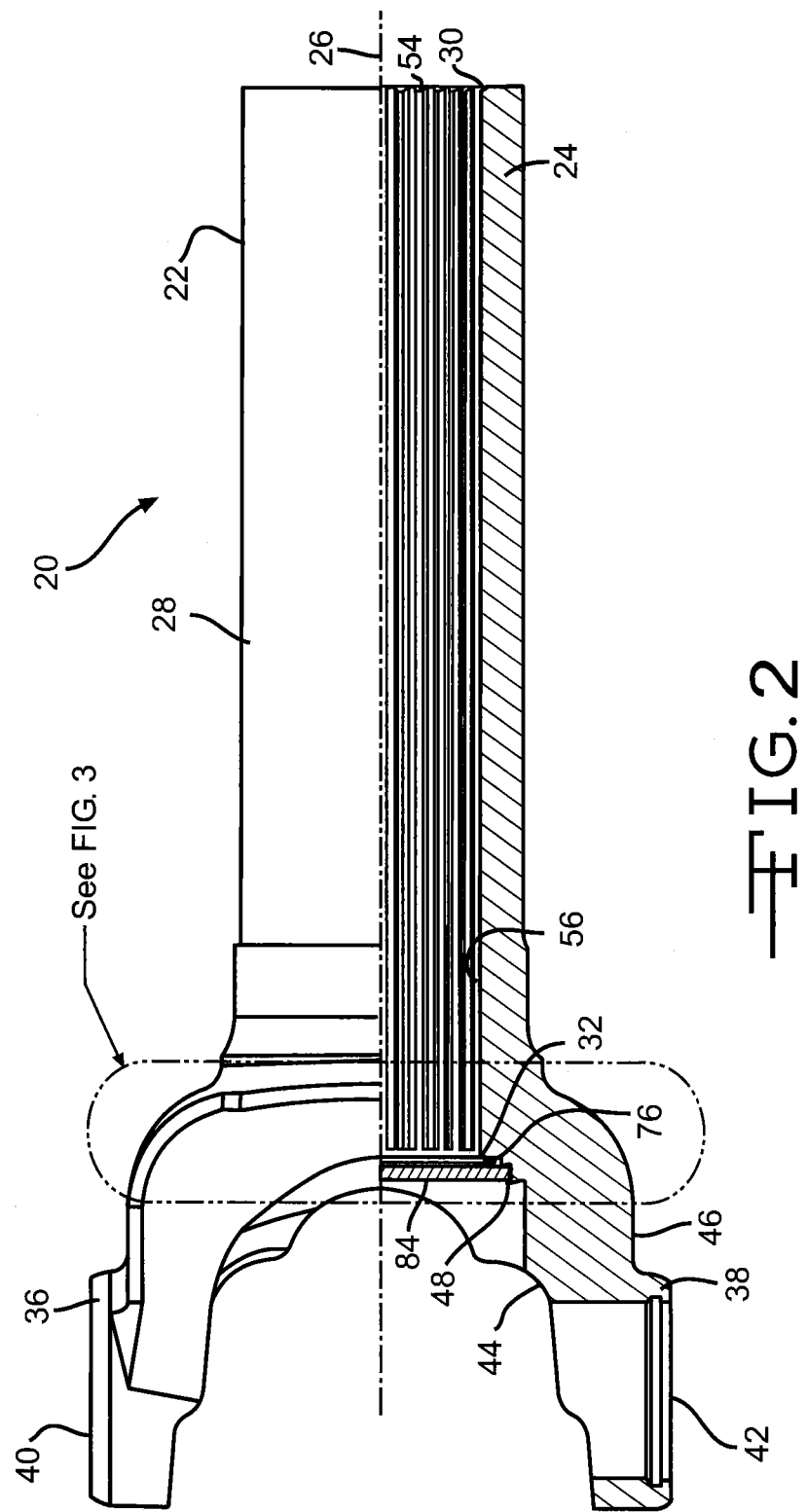
FIG. 2 is a partial cross sectional view of an embodiment of the slip yoke assembly of FIG. 1.
Figure 3:
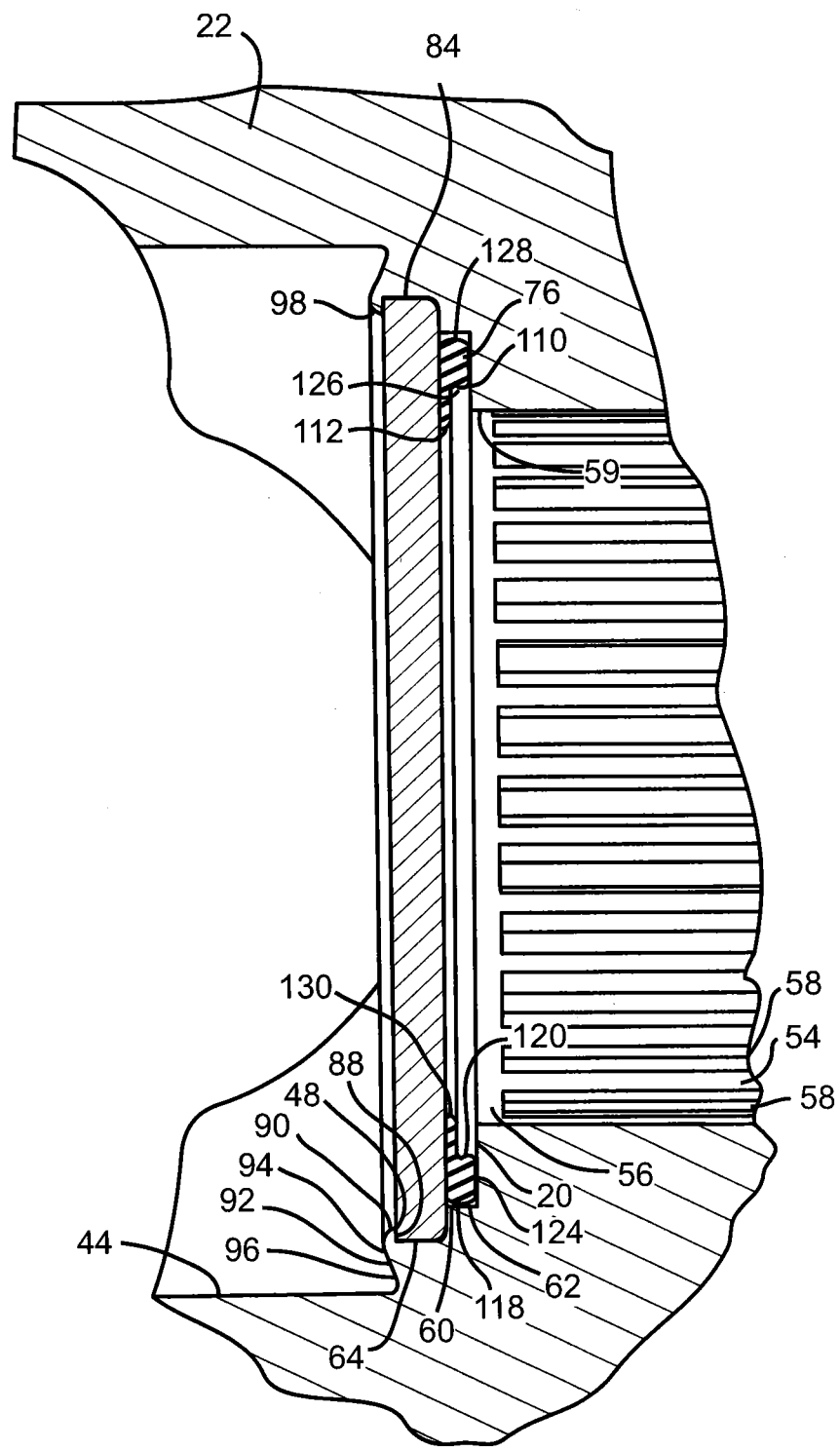
FIG. 3 is an enlarged cross-sectional view of a portion of the slip yoke assembly of FIG. 2.

Referring now to the drawings, there is illustrated in FIGS. 1-3 an embodiment of a slip yoke assembly 20 which hereinafter may also be referred to as the "assembly."

As depicted, the slip yoke assembly 20 comprises a slip yoke 22. The slip yoke 22 is preferably formed from a metallic material such as steel and iron. The slip yoke 22 includes a hollow cylindrical body 24 and is rotatable about a longitudinal axis 26. The body 24 includes an outer cylindrical surface 28, a first end 30, and a second end 32.

The slip yoke 22 also includes a pair of opposed lug ears 36, 38. Each lug ear 36, 38 is attached to the body 24 and extends in a generally axial direction from the body 24. Each lug ear 36, 38 has a generally cylindrical opening 40, 42 formed therethrough. The openings 40, 42 are coaxial with one another.

Each lug ear 36, 38 includes an inner surface 44 and an outer surface 46. The inner surface 44 extends from each opening 40, 42 to a lip 48. The outer surface 46 extends from an opposite end of each opening 40, 42 to the body 24. Each lug ear 36, 38 includes a pair of side surfaces 50, 50A, 52, 52A between the inner surface 44 and the outer surface 46.

As shown best in FIGS. 2-3, the slip yoke 22 comprises a long bore 54 extending through the body 24. The long bore 54 extends between the first end 30 and the second end 32. The long bore 54 defines an inner surface 56 of the body 24. The long bore 54 has a major diameter 59 defined by the inner surface 56 that is of a radial length. The long bore 54 is splined and has a plurality of splined teeth 58 formed thereon. The teeth 58 extend longitudinally and the length of the long bore 54. The teeth 58 also extend radially inward.

The long bore receives and interconnects with a splined end portion (not depicted) of a driveshaft (not depicted) or another attaching member (not depicted). The splined end portion extends through the long bore 54 and ends adjacent the second end 32. The splined end portion can slide axially relative to the long bore 54 under certain conditions.

The slip yoke 22 has a counterbore 60 at the second end 32 of the long bore 54. The counterbore 60 comprises a first diameter 62 and a second diameter 64. The first diameter 62 and second diameter 64 are located radially about the longitudinal axis 26 of the slip yoke 22. The second diameter 64 is of a length which is greater than the first diameter 62. The first diameter 62 is of a length which is greater than that of the major diameter 59 of the long bore 54.

As best illustrated in FIG. 4, where portions of the assembly 20 have been removed for the purpose of describing features of the slip yoke 22, the first diameter 62 is defined by a first wall 66. On an end 68, the first wall 66 is attached to a seal surface 70. The seal surface 70 extends radially inward from the first wall 66. The seal surface 70 is also attached to the inner surface 56 of the long bore 54. The seal surface 70 separates the first wall 66 from the long bore 54.

On an opposite end 72, the first wall 66 is attached to a stop portion 74. The stop portion 74 is provided to limit the amount of compression that is experienced by an elastomeric member 76, 76B, 76C when the assembly 20 is formed. The stop portion 74 extends radially outward from the first wall 66.

The stop portion 74 comprises an inclined surface 78 and an inboard edge 80. The inboard edge 80 is attached to the first wall 66 and the inclined surface 78. The inclined surface 78 is attached to a concave receiving portion 82. As illustrated in FIG. 3, the concave receiving portion 82 receives a portion of a plug 84, 84A, 84B, 84C when the assembly 20 is formed.

The concave receiving portion 82 is attached to a second wall 86. The second wall 86 defines the second diameter 64. The concave receiving portion 82 is provided radially inward from the second wall 86. As illustrated in FIG. 3, the second wall 86 is also attached to the lip 48.

The lip 48 comprises a radial surface 88, an outer surface 90 and an inclined surface 92. The outer surface 90 is attached to an end 94 of the inclined surface 92. On an opposite end 96, the inclined surface 92 is attached to the inner surface 44 of the lug ears 36, 38. The outer surface 90 is also attached to the radial surface 88. The radial surface 88 is attached to the second wall 86.

Preferably, the lip is annular. In an embodiment, the lip 48 is contiguous. In this embodiment, the lip 48 defines a diameter 98 which is of a length that is greater than that of the first diameter 62 but less than that of the second diameter 64. Preferably, the lip 48 is formed by a staking.

The slip yoke assembly comprises the plug 84, 84A, 84B, 84C. Preferably, the plug 84, 84A, 84B, 84C is formed from a metallic material such as steel or copper. Embodiments of the plug 84, 84A, 84B, 84C which are suitable for use in the slip yoke assembly 20 are best shown in FIGS. 5-10, which will be utilized to illustrate and describe various features of these embodiments of the plug. It should be appreciated that the features illustrated and described for one embodiment of the plug 84, 84A, 84B, 84C can be utilized in the other embodiments of the plug shown in FIGS. 5-10. Additionally, it should be appreciated that in certain embodiments (not depicted), the slip yoke assembly 20 is not limited to the embodiments of the plug 84, 84A, 84B, 84C shown in FIGS. 5-10.

Preferably, the plug 84, 84A, 84B, 84C is of a welch type. The plug 84, 84A, 84B, 84C comprises an outer edge 100, a first surface 102 and a second surface 104. The first surface 102 and the second surface 104 each comprise an outer edge portion 106, 106A. Referring now to FIG. 3, the lip 48 is preferably formed over the outer edge 100 and about the outer edge portion 106A of the second surface 104. The inboard edge 80 of the stop portion 74 contacts the outer edge portion 106 of the first surface 102. The outer edge 100 of the plug 84, 84A, 84B, 84C faces and abuts the second wall 86 of the slip yoke 22. The outer edge 100 defines an outer diameter 108 of the plug 84, 84A, 84B, 84C.

Figure 6A:
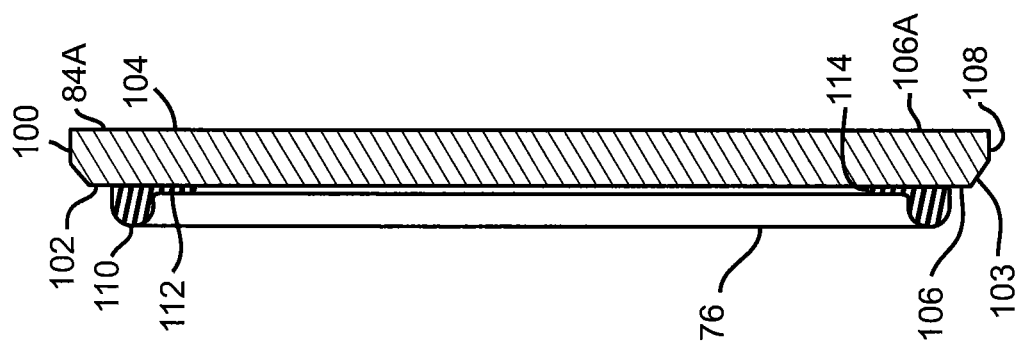
FIG. 6A is a cross-sectional view of an embodiment of a plug suitable for use in the slip yoke assembly.
Figure 6:
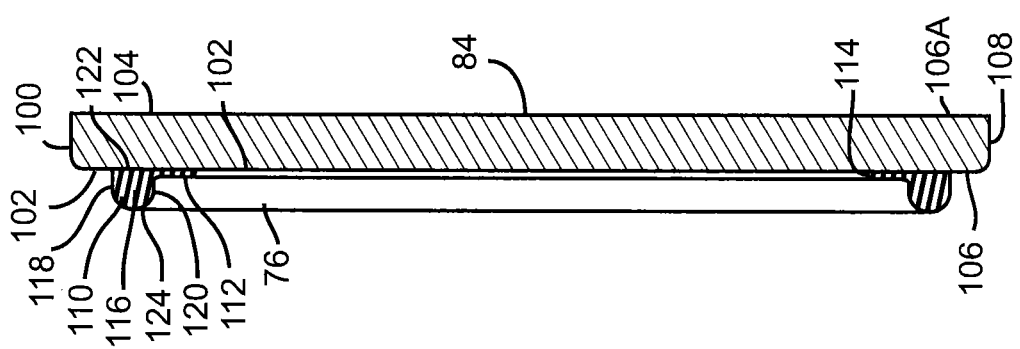
FIG. 6 is a cross-sectional view of the plug of FIG. 5.
Figure 5:
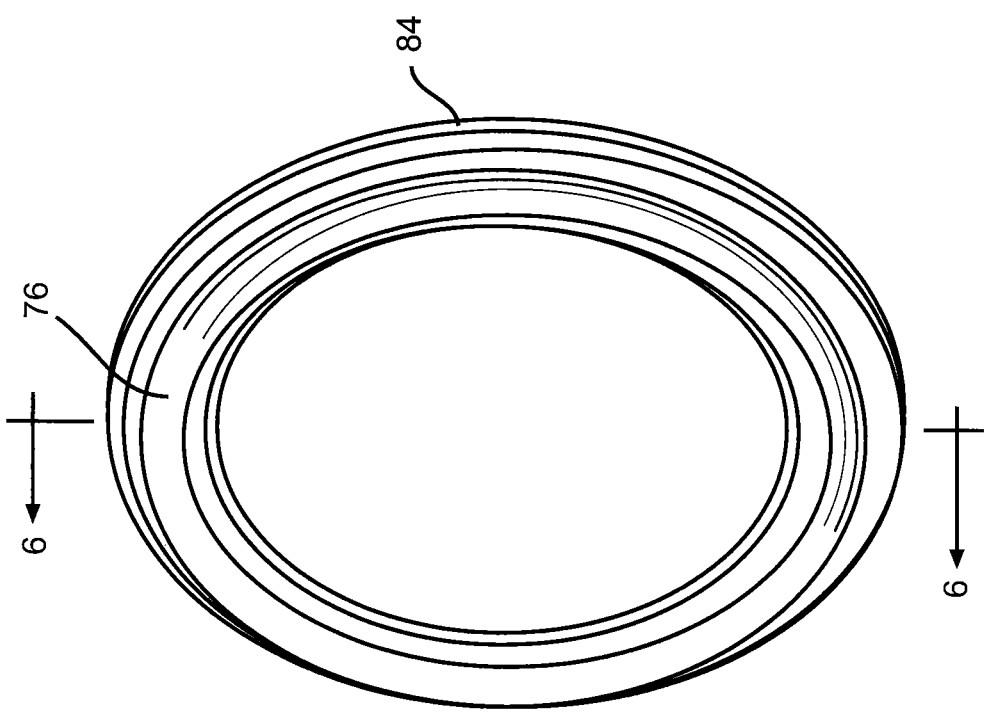
FIG. 5 is a perspective view of an embodiment of a plug suitable for use in the slip yoke assembly.
Figure 8:
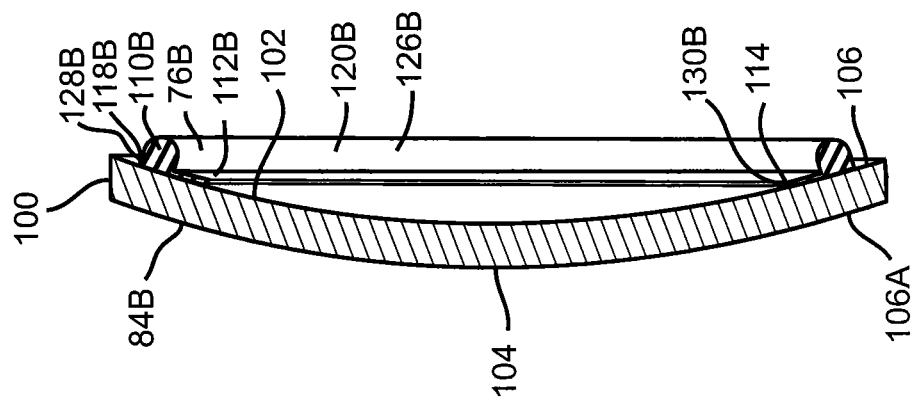
FIG. 8 is a cross-sectional view of the plug of FIG. 7.
Figure 7:
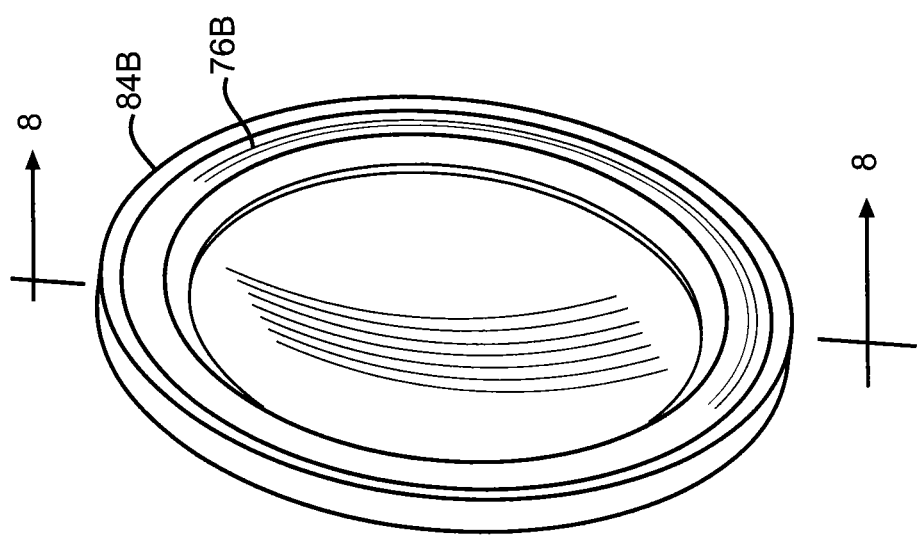
FIG. 7 is a perspective view of an embodiment of a plug suitable for use in the slip yoke assembly.

Referring now to the embodiments illustrated in FIGS. 5-6, 6A and 9-10, the first surface 102 and second surface 104 of the plug 84, 84A, 84C may be provided in a parallel relationship with each other. However, the plug is not limited to having parallel first and second surfaces. For example, as shown in FIGS. 7-8, the first surface 102 and second surface 104 may not be provided in a parallel relationship with each other. In this embodiment, the plug 84B may be dome-shaped. Additionally, as illustrated in FIG. 6A, in an embodiment a chamfered surface 103 may be provided about the first surface 102 and between the outer edge and the first surface 102. In this embodiment, the chamfered surface 103 is attached to the first surface 102 on an end and the outer edge 100 on an opposite end.

Figure 10:
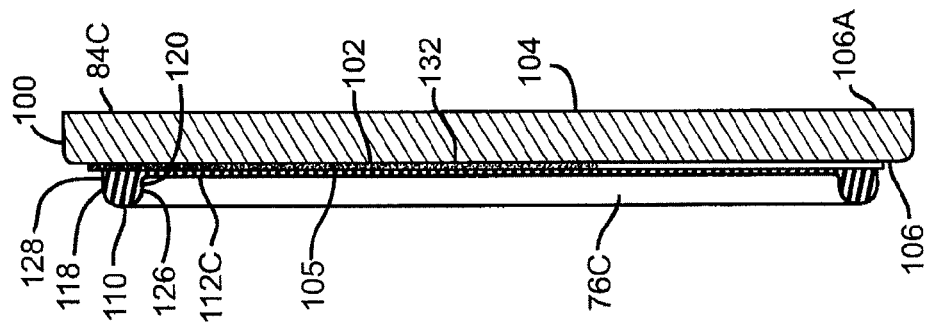
FIG. 10 is a cross-sectional view of the plug of FIG. 9.
Figure 9:
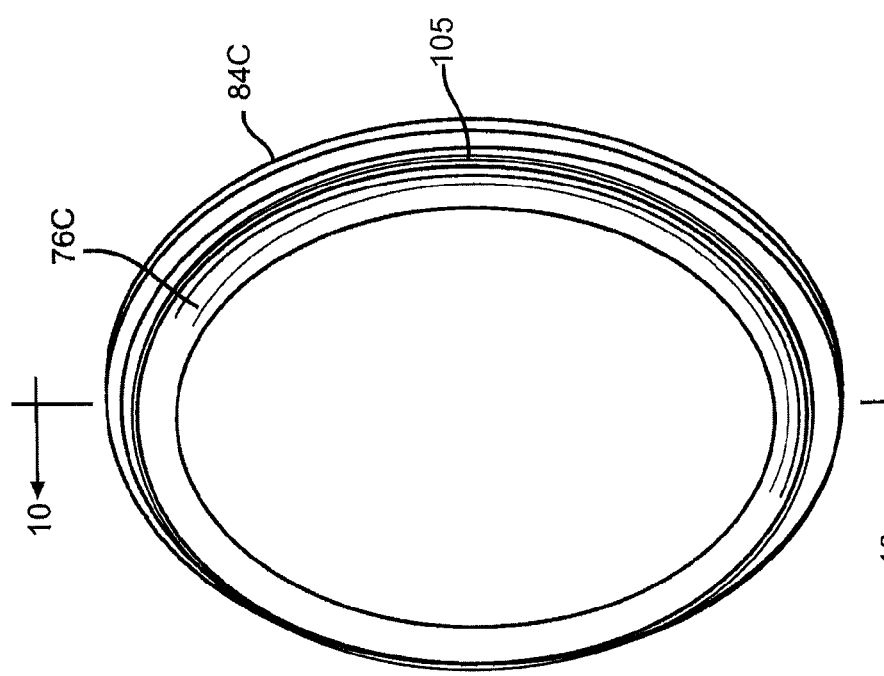
FIG. 9 is a perspective view of an embodiment of a plug suitable for use in the slip yoke assembly.

The elastomeric member 76, 76B, 76C is secured to the first surface 102 of the plug 84, 84A, 84B, 84C. Most preferably, the elastomeric member 76, 76B, 76C is permanently secured to the first surface 102 of the plug 84, 84A, 84B, 84C. As shown in FIGS. 9 and 10, the elastomeric member 76, 76B, 76C is preferably secured to the plug 84, 84A, 84B, 84C via an adhesive 105.

Preferably, the elastomeric member 76, 76B, 76C is formed from a rubber material. Suitable rubber materials for use in forming the elastomeric member 76, 76B, 76C are polyacrylate, ethylene acrylate, nitrile, and ethylene acrylic rubber and blends thereof. However, in other embodiments, the elastomeric member is not limited to the above-listed materials and may be formed from other materials.

The elastomeric member 76, 76B, 76C comprises an outer edge portion 110 and an inner portion 112, 112B, 112C. The outer edge portion 110 is of a thickness which is greater than the thickness of the inner portion 112, 112B, 112C. Preferably, the outer edge portion 110 and the inner portion 112, 112B, 112C are formed in a unitary manner.

The elastomeric member 76, 76B, 76C may comprise a generally circular-shape. In an embodiment, the elastomeric member 76, 76B may be ring-shaped such that it comprises an inner diameter 114 which defines an aperture which extends through the elastomeric member 76, 76B. In another embodiment, the elastomeric member 76C is a solid body and may be generally disk-shaped.

The outer edge portion 110 comprises a sealing portion 116, an outer end wall 118 and an inner end wall 120. The outer end wall 118 is attached to the sealing portion 116 on a side thereof and the inner end wall 120 is attached to the sealing portion 116 on an opposite side thereof. The sealing portion 116 comprises a bonding surface 122 and a sealing surface 124. The bonding surface 122 is attached to the first surface 102 of the plug 84, 84A, 84B, 84C. The sealing surface 124 is attached to the seal surface 70 of the slip yoke 22.

Prior to forming the assembly 20, the sealing surface 124 may be rounded as shown best in, for example, in FIGS. 6, 6A, 8 and 10. However, during formation of the assembly 20, the outer edge portion 110 may radially deform so that the sealing surface 124 can conform to the contour of the seal surface 70 as is shown in FIG. 3. Thus, when the assembly 20 is formed, the sealing surface 124 may be flat and extend radially between the inner end wall 120 and outer end wall 118.

The inner end wall 120, 120B defines a first inner diameter 126, 126B and the outer end wall 118 defines a first outer diameter 128, 128B of the outer edge portion 110, 110B. Preferably, the first outer diameter 128, 128B is of a length which is less than that of the outer diameter 108 of the plug 84, 84A, 84B, 84C. In certain embodiments, the inner portion 112, 112B defines a second inner diameter 130, 130B. In these embodiments, first inner diameter 126, 126B is of a length which is greater than that of the second inner diameter 130, 130B. However, in other embodiments like the one illustrated in FIGS. 9-10, the inner portion 112C does not define a second inner diameter. Instead, in this embodiment, the inner portion 112C is of a generally circular shape and covers a generally circular portion 132 of the first surface 102 of the plug 84C.

Referring now to FIG. 4A, the slip yoke assembly 20 is formed by providing the slip yoke 22 and positioning the plug 84, 84A, 84B, 84C and elastomeric member 76, 76B, 76C within the counterbore 60. As illustrated, a space 134 is provided between the first wall 66 and the elastomeric member 76, 76B, 76C. Next, the lip 48 is formed by staking or the like and the elastomeric member 76, 76B, 76C is compressed such that it deforms radially in the direction of the space 134 and toward the long bore 54. As illustrated best in FIG. 3, when the assembly 20 is formed the space 134 is no longer present having been replaced by portions of the elastomeric member 76, 76B, 76C.

As illustrated best in FIG. 3, the first wall 66 is of thickness which is less than the thickness of the outer edge portion 110 of the elastomeric member 76, 76B, 76C. As such, the elastomeric member 76, 76B, 76C is compressed when the slip yoke assembly 20 is formed. More specifically, the outer edge portion 110 of the elastomeric member 76, 76B, 76C is compressed when the assembly 20 is formed. Preferably, the outer edge portion 110 is compressed by about 10-50%. More preferably, the outer edge portion 110 is compressed by about 19-32%. Maintaining the compression of the elastomeric member 76, 76B, 76C in the aforementioned ranges provides a fluid tight seal at the end of the slip yoke 22 and allows the elastomeric member 76, 76B, 76C to retain its resilience.

When the slip yoke assembly 20 is formed, the elastomeric member 76, 76B, 76C is disposed within the first diameter 62 of the counterbore 60. The plug 84, 84A, 84B, 84C is disposed within the second diameter 64 of the counterbore 60 and is secured to the slip yoke 22 by the lip 48. The lip 48 is formed over the plug 84, 84A, 84B, 84C. Preferably, the lip 48 is contiguous and formed annularly about the outer edge portion 106A of the plug 84, 84A, 84B, 84C. In an embodiment, the plug 84, 84A, 84B, 84C is of a thickness which is less than the thickness of the counterbore 60 but greater than the thickness of the outer edge portion 110 of the elastomeric member 76, 76B, 76C.

The foregoing description is considered as illustrative only of the principles of the invention. Further, since numerous modifications and changes will readily occur to those skilled in the art, it is not desired to limit the invention to the exact construction and assemblies shown and described herein. Accordingly, all suitable modifications and equivalents may be considered as falling within the scope of the invention as defined by the claims which follow.

What is claimed is:

1. A slip yoke assembly, comprising:
    a slip yoke having a long bore which is splined and extends between a first end and a second end and a counterbore at the second end of the long bore, wherein a pair of opposed lug ears extend away from the second end of the long bore and the counterbore has a first diameter and a second diameter, wherein the first diameter is greater than a major diameter of the long bore and the second diameter is greater than the first diameter; and
    a plug having an elastomeric member secured to a surface thereof, wherein the elastomeric member is disposed within the first diameter and the plug is disposed within the second diameter and wherein the plug is secured to the slip yoke by a lip formed over the plug.

2. The slip yoke assembly defined by claim 1, wherein the first diameter is defined by a first wall which is of thickness that is less than a thickness of an outer edge portion of the elastomeric member.

3. The slip yoke assembly defined by claim 1, wherein the second diameter is defined by a second wall which is attached to a concave receiving portion provided radially inward from the second wall.

4. The slip yoke assembly defined by claim 3, wherein the concave receiving portion receives a portion of the plug.

5. The slip yoke assembly defined by claim 3, wherein the plug is of a thickness which is less than a thickness of the second wall.

6. The slip yoke assembly defined by claim 1, wherein the elastomeric member is permanently secured to the plug.

7. The slip yoke assembly defined by claim 1, wherein the lip is annular, contiguous and formed about an outer edge portion of the plug.

8. The slip yoke assembly defined by claim 1, wherein a fluid tight seal is provided at the second end of the slip yoke.

9. The slip yoke assembly defined by claim 1, wherein the plug is dome-shaped.

10. The slip yoke assembly defined by claim 1, wherein the plug comprises a first surface and a second surface which is in a parallel relationship with the first surface.

11. The slip yoke assembly defined by claim 1, wherein the elastomeric member comprises an outer edge portion and an inner portion.

12. The slip yoke assembly defined by claim 11, wherein the inner portion defines a second inner diameter which is of a length which is less than a diameter defined by an inner end wall.

13. The slip yoke assembly defined by claim 11, wherein the outer edge portion is of a thickness which is greater than a thickness of the inner portion.

14. The slip yoke assembly defined by claim 11, wherein the outer edge portion is compressed by about 10-50%.

15. The slip yoke assembly defined by claim 14, wherein the outer edge portion is compressed by about 19-32%.

16. The slip yoke assembly defined by claim 11, wherein the outer edge portion comprises a sealing surface which is attached to a seal surface of the slip yoke to provide a fluid tight seal at the end of the slip yoke.

17. The slip yoke assembly defined by claim 1, wherein the elastomeric member is secured to the plug via an adhesive.

18. The slip yoke assembly defined by claim 1, wherein the lip is formed by staking.

19. The slip yoke assembly defined by claim 1, wherein the elastomeric member is ring-shaped.

20. The slip yoke assembly defined by claim 1, wherein the elastomeric member is generally disk-shaped.

* * * * *